US007013043B2

(12) United States Patent
Kashioka

(10) Patent No.: US 7,013,043 B2
(45) Date of Patent: Mar. 14, 2006

(54) METHOD OF AND APPARATUS FOR IMAGE PROCESSING

(75) Inventor: Atsushi Kashioka, Ibaraki-Ken (JP)

(73) Assignee: Riso Kagaku Corporation, Tokyo (JP)

( * ) Notice: Subject to any disclaimer, the term of this patent is extended or adjusted under 35 U.S.C. 154(b) by 1072 days.

(21) Appl. No.: 09/814,750

(22) Filed: Mar. 23, 2001

(65) Prior Publication Data
US 2001/0033399 A1 Oct. 25, 2001

(30) Foreign Application Priority Data
Mar. 23, 2000 (JP) ............................. 2000-081407

(51) Int. Cl.
*G06K 9/00* (2006.01)
*G03F 3/08* (2006.01)
(52) U.S. Cl. ...................... 382/167; 358/518
(58) Field of Classification Search ............... 382/162, 382/164, 165, 167, 199; 358/504, 509, 518, 358/520, 530; 345/87, 467, 589, 634; 348/279; 715/848; 347/115
See application file for complete search history.

(56) References Cited

U.S. PATENT DOCUMENTS

| 4,308,553 A | | 12/1981 | Roetling | |
|---|---|---|---|---|
| 5,140,348 A | * | 8/1992 | Jamzadeh et al. | 347/115 |
| 5,742,287 A | * | 4/1998 | Lection et al. | 715/848 |
| 5,825,917 A | * | 10/1998 | Suzuki | 382/164 |
| 6,249,273 B1 | * | 6/2001 | Plog | 345/467 |
| 6,449,013 B1 | * | 9/2002 | Suzuki et al. | 348/279 |
| 6,515,677 B1 | * | 2/2003 | Lee et al. | 345/634 |
| 6,628,829 B1 | * | 9/2003 | Chasen | 382/167 |
| 6,700,557 B1 | * | 3/2004 | McKnight | 345/87 |

FOREIGN PATENT DOCUMENTS

| EP | 0 463 844 A2 | 1/1992 |
|---|---|---|
| EP | 0 930 775 A2 | 7/1999 |
| JP | 06-059657 A | 3/1994 |

OTHER PUBLICATIONS

European Search Report Dated Dec. 4, 2003.

* cited by examiner

*Primary Examiner*—Andrew W. Johns
*Assistant Examiner*—Amir Alavi
(74) *Attorney, Agent, or Firm*—Donald Studebaker; Nixon Peabody, LLP

(57) ABSTRACT

A monochromatic image signal is made from a color image signal. Values of brightness of pixels in a color border region of a type where two color regions which are small in brightness difference and large in chromaticity difference are positioned side by side are changed to new values different from those represented by the image signal component for the pixel of the color image signal, and a monochromatic image signal is generated with values of brightness of pixels in the color border region set to the new values and values of brightness of pixels in regions other than the color border region set to those as represented by the image signal components for the pixels of the color image signal.

11 Claims, 8 Drawing Sheets

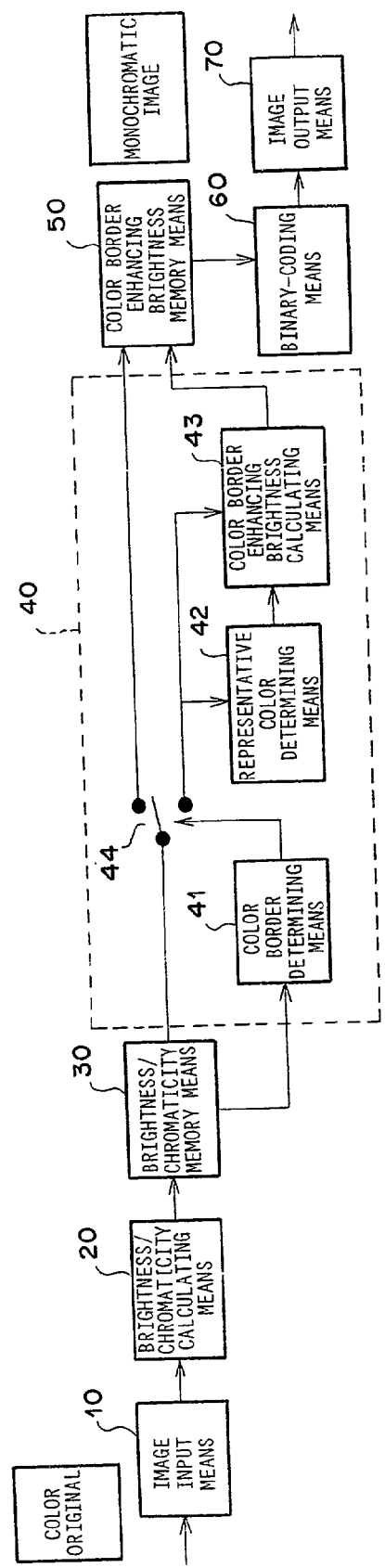
FIG. 1

FIG. 2A
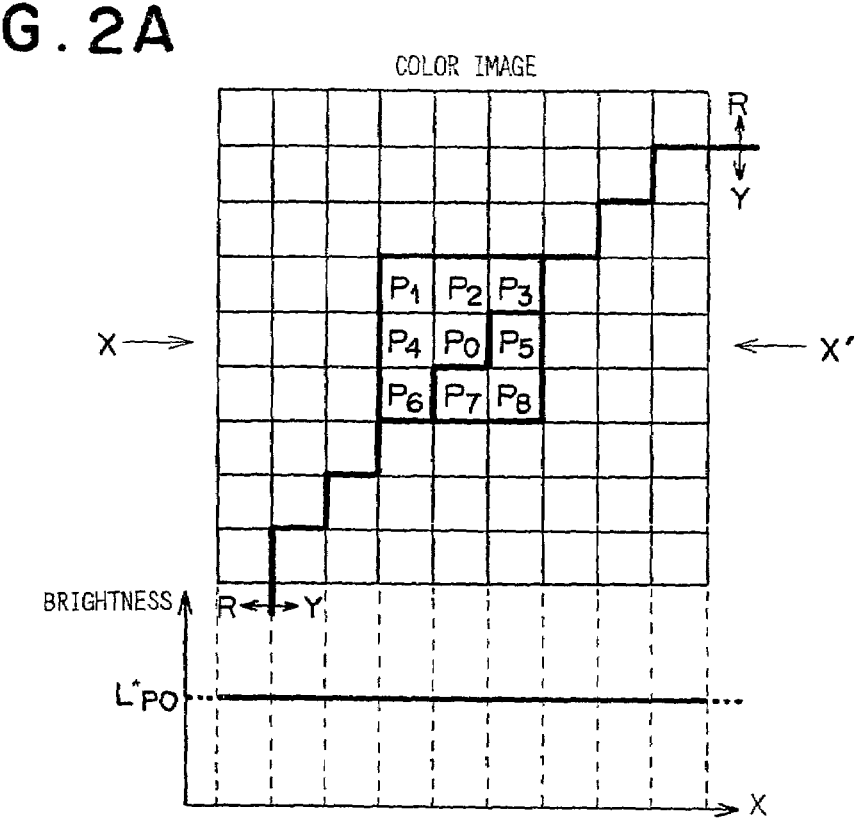
FIG. 2B
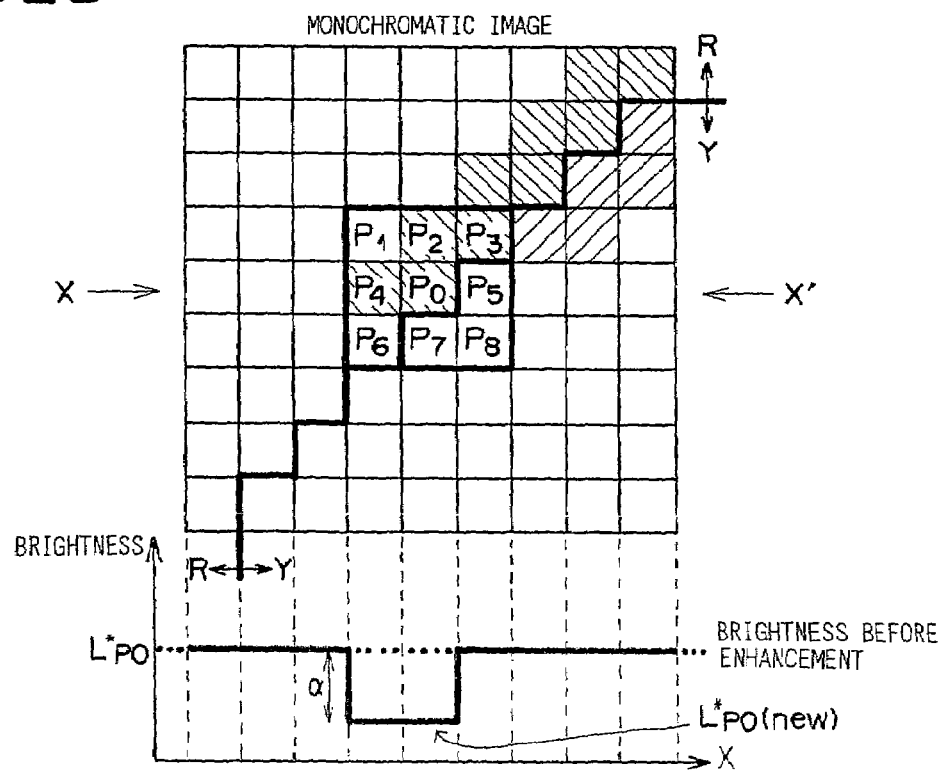

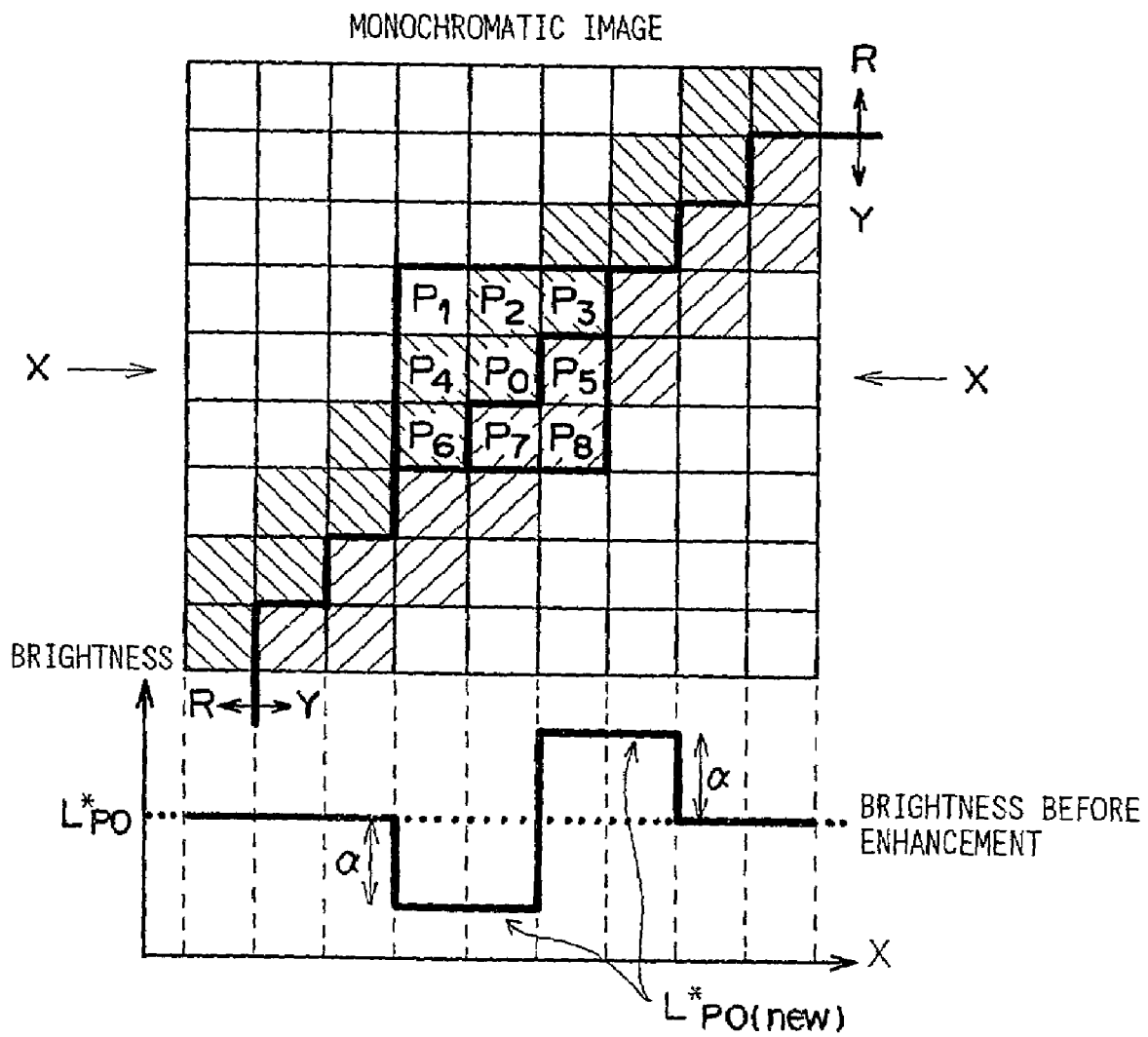

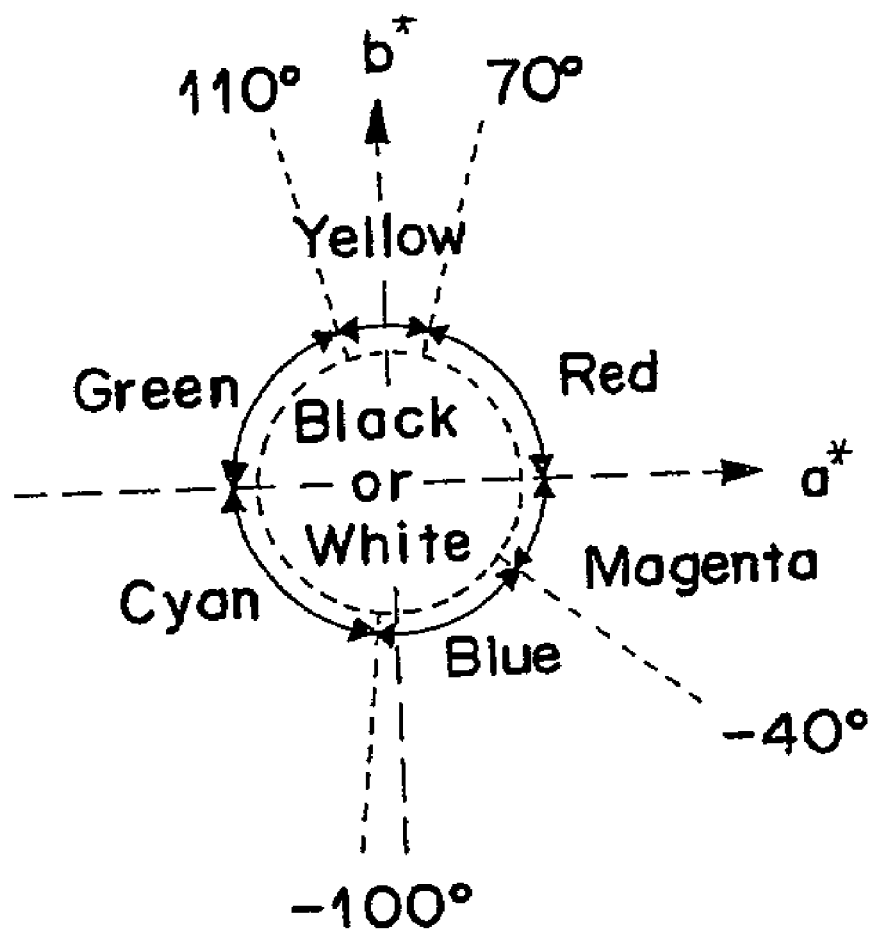
FIG.4

F I G. 5A
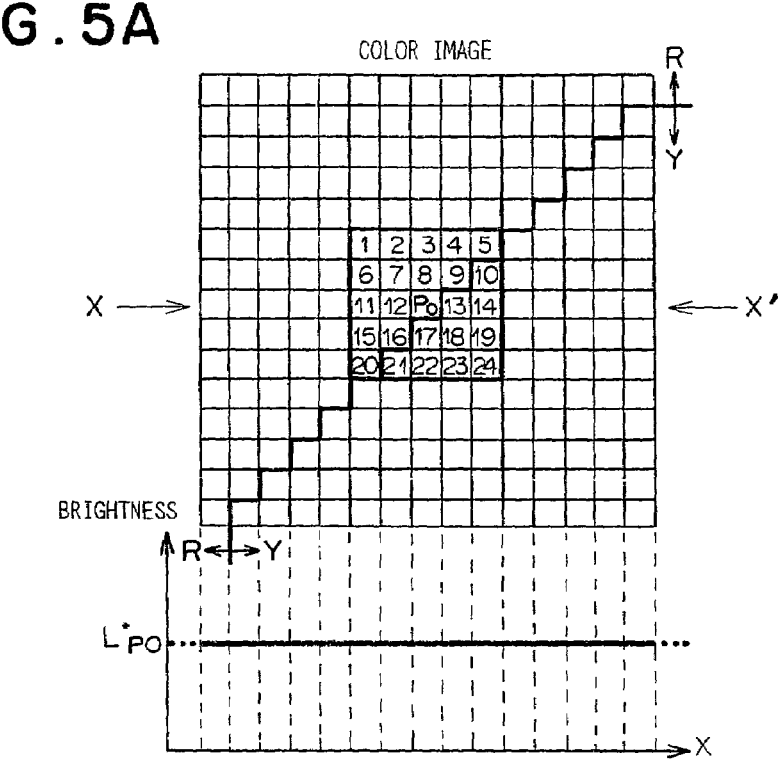
F I G. 5B
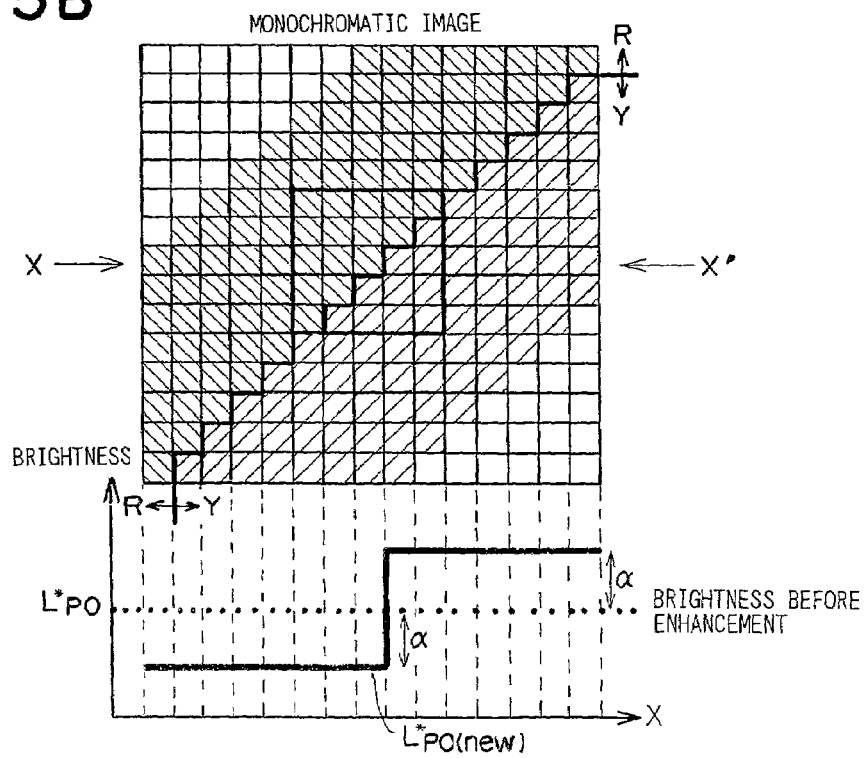

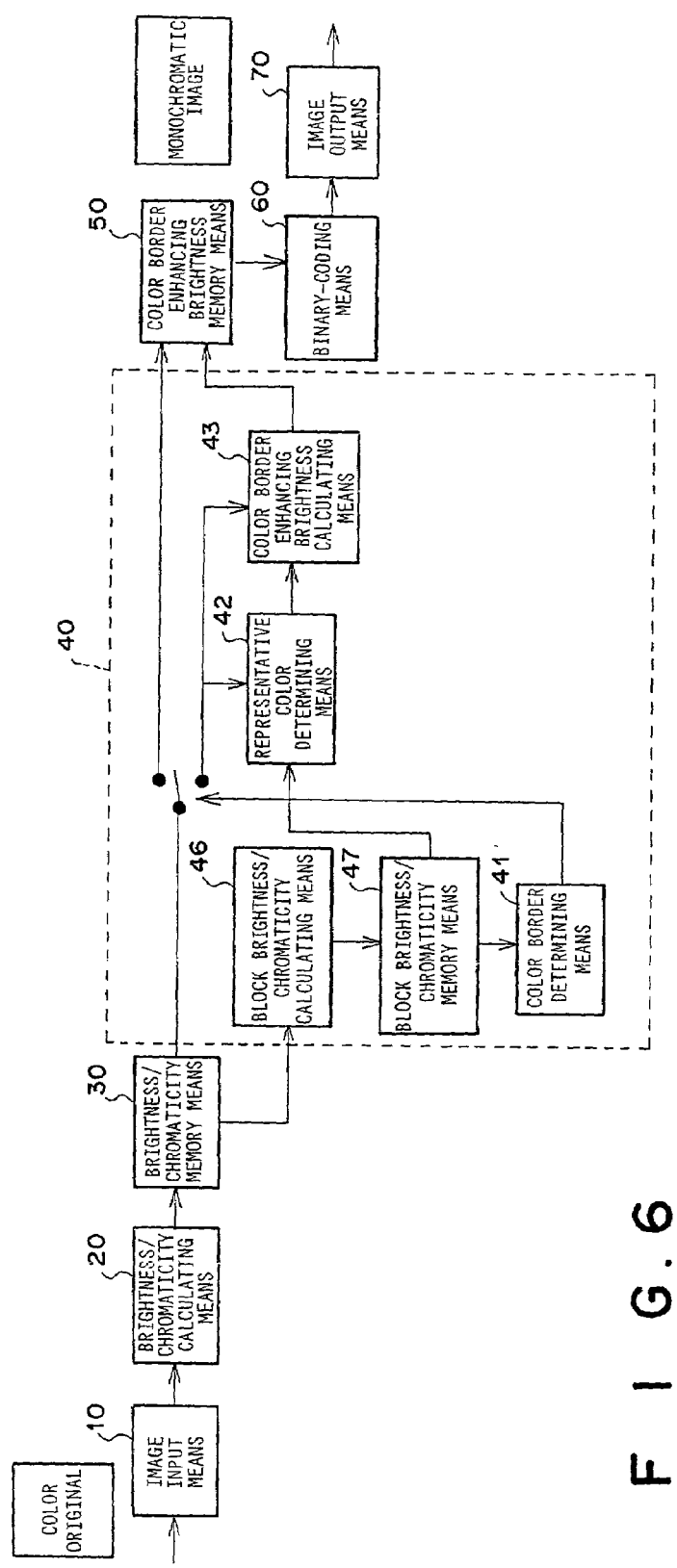
FIG. 6

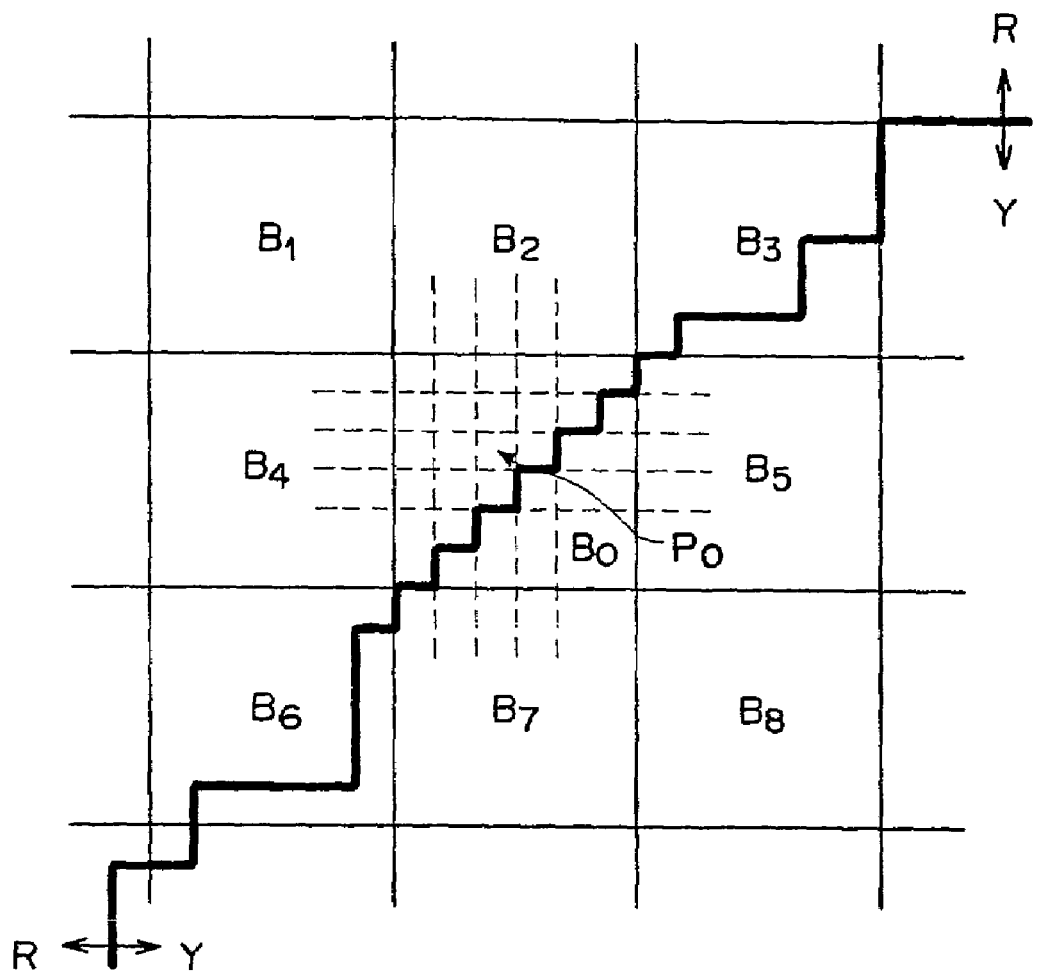

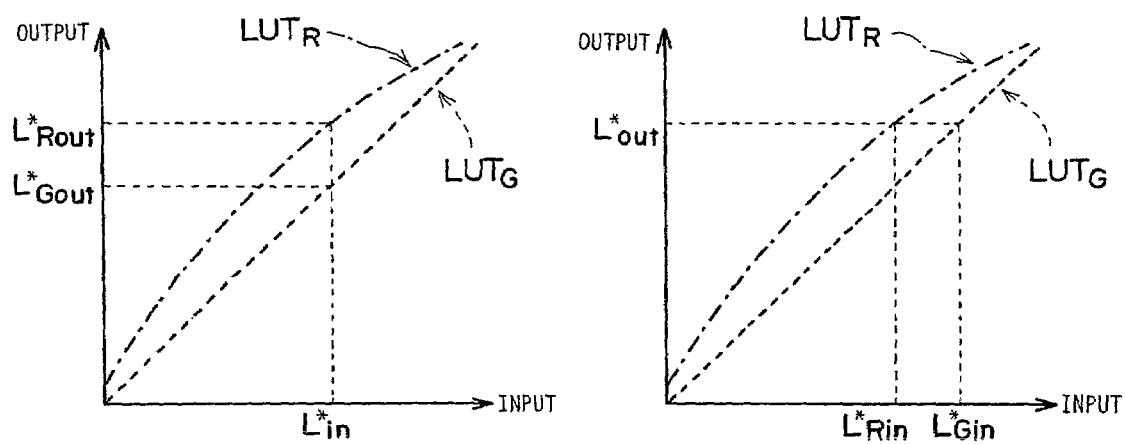
PRIOR ART
F I G. 8A
PRIOR ART
F I G. 8B

METHOD OF AND APPARATUS FOR IMAGE PROCESSING

BACKGROUND OF THE INVENTION

1. Field of the Invention

This invention relates to a method of and an apparatus for image processing which are applicable to an image display, a copier, a facsimile and the like, and more particularly to a method of and an apparatus for image processing in which a color image signal (made up of image signal components representing image data on respective pixels) is converted into a monochromatic (black and white) image signal and a monochromatic image output is obtained on the basis of the monochromatic image signal.

2. Description of the Related Art

Recently as the color scanner becomes less expensive and/or by the advent of a digital camera and the like, it becomes feasible to easily make a color image signal by the use of various image input unit, and accordingly, a chance for the display, copier, facsimile or the like to output a monochromatic image on the basis of a color image signal has been increased.

When a monochromatic image is to be output on the basis of a color image signal, the color image signal has to be once converted to a monochromatic image signal by means of an image processing apparatus as disclosed, for instance, in Japanese Unexamined Patent Publication No. 6(1994)-59657.

In the method of conversion disclosed in Japanese Unexamined Patent Publication No. 6(1994)-59657, the color image signal is divided into a hue signal, a brightness signal and a chroma signal and a tone value for a pixel is determined taking into account the hue of the pixel in addition to the brightness of the pixel according to gray tables (tone conversion tables) which have been prepared hue by hue taking into account the fact that colors at the same brightness can be viewed different in brightness when hues are different.

For example, when a color image signal component $L^*_{in}$ for a pixel is input as shown in FIG. 8A, a monochromatic image signal component $L^*_{Rout}$ is output according to a gray table for red $LUT_R$ when the hue represented by the color image signal component $L^*_{in}$ is red, and a monochromatic image signal component $L^*_{Gout}$ is output according to a gray table for green $LUT_G$ when the hue represented by the color image signal component $L^*_{in}$ is green. As a result, when two regions which are of the same brightness and of different hues exist side by side on a color image, the two regions are expressed different in brightness on a monochromatic image, whereby the difference in hue on a color image can be expressed on a monochromatic image, and information on brightness which can be visually detected on the color image can be preserved on the monochromatic image. That is, halftone image signal components of a color image signal can be clearly expressed by monochromatic image components.

However, the method of conversion disclosed in Japanese Unexamined Patent Publication No. 6(1994)-59657 is disadvantageous in that the monochromatic image signal component $L^*_{Gout}$ according to a gray table for green $LUT_G$ for a green color image signal component $L^*_{Gin}$ and the monochromatic image signal component $L^*_{Rout}$ according to a gray table for red $LUT_R$ for a red color image signal component $L^*_{Rin}$ representing brightness different from that of the green color image signal component $L^*_{Gin}$ can become equal to each other as shown in FIG. 8B. That is, pixels which are different from each other in both hue and brightness on a color image can be expressed in the same tone on a monochromatic image, whereby information on a difference in hue between two adjacent regions is lost on a monochromatic image.

SUMMARY OF THE INVENTION

In view of the foregoing observations and description, the primary object of the present invention is to provide an image processing method and an image processing apparatus which can make a monochromatic image signal from a color image signal without loss of brightness information and hue information.

In accordance with the present invention, the values of brightness of pixels in a color border region of a type where two color regions which are small in brightness difference and large in chromaticity difference are positioned side by side are changed to those different from those represented by the color image signal and the values of brightness of pixels in regions other than the color border region are set to those as represented by the color image signal as they are, whereby the color border region can be enhanced on a monochromatic image as change in tone.

That is, in accordance with a first aspect of the present invention, there is provided a method of making a monochromatic image signal made up of image signal components representing image data on respective pixels from a color image signal made up of image signal components representing image data on respective pixels, the method characterized in that values of brightness of pixels in a color border region of a type where two color regions which are small in brightness difference and large in chromaticity difference are positioned side by side are changed to new values different from those represented by the image signal component for the pixel of the color image signal, and a monochromatic image signal is generated with values of brightness of pixels in the color border region set to said new values and values of brightness of pixels in regions other than the color border region set to those as represented by the image signal components for the pixels of the color image signal.

The color image signal may be, for instance, an image signal obtained by reading a color original by an image scanner or an image signal obtained by a digital camera.

The values of brightness and chromaticity may be in any terms. For example, the values of brightness and chromaticity may be represented by $L^*a^*b^*$ values or $L^*u^*v^*$ values in a CIE color system.

The monochromatic image signal obtained may be used in any way. For example, the monochromatic image signal may be binary-coded and used for printing or making a stencil, or may be used for displaying a color image on a monochromatic display, or may be used for transferring a color original from a color facsimile to a black and white facsimile.

In a first aspect of the method of the present invention, an image processing method comprises the step of determining whether a designated pixel is a pixel in a color border region of a type where two color regions which are small in brightness difference and large in chromaticity difference are positioned side by side on the basis of the difference in value of brightness between the designated pixel and neighbor pixels near the designated pixel and the difference in value of chromaticity between the designated pixel and the neighbor pixels, the steps of, when the designated pixel is determined to be a pixel in a color border region of said type, obtaining the values of brightness and chromaticity of at least two colors representative of colors (will be sometimes referred to as "the representative colors") forming the color border on the basis of the values of brightness and chromaticity of the neighbor pixels, and changing the value of brightness of the designated pixel to a new value different from that represented by the image signal component for the pixel of the color image signal on the basis of the values of brightness and chromaticity of the designated pixel as represented by the image signal component for the pixel of the color image signal, the values of brightness and chromaticity of the respective representative colors and a preset order of priority of colors, and the step of making a monochromatic image signal by setting values of brightness of pixels in the color border region to said new values and setting values of brightness of pixels in regions other than the color border region to those as represented by the image signal components for the pixels of the color image signal. That is, in the image processing method of the first aspect, whether a designated pixel is a pixel in a color border region of said type is determined on the basis of the values of the designated pixel and the neighbor pixels, and the value of brightness of the designated pixel in the monochromatic image signal is changed from that represented by the color image signal component when the designated pixel is determined to be a pixel in a color border region of said type.

The colors representative of colors forming the color border are the typical colors to which two colors on opposite sides of the color border belong and may be determined in any known method.

The range of the neighbor pixels may be changed according to the type of image to be processed so that color border portions can be accurately determined. For example, in the case of an image of illustration type, the range of the neighbor pixels may be of a relatively small size (e.g., 3×3 pixels). As the size of the range of the neighbor pixels becomes smaller, the amount data to be handled is reduced and the processing is facilitated.

In the method of the first aspect, when the designated pixel is determined to be a pixel in a color border region of said type, the value of brightness of each pixel in a predetermined region about the designated pixel may be changed to a value different from that represented by the image signal component for the pixel of the color image signal on the basis of the values of brightness and chromaticity of the pixel, the values of brightness and chromaticity of the respective representative colors and a preset order of priority of colors.

In this case, the value of brightness is changed for not only the pixel determined to be a color border pixel but also the pixels in the region about the color border pixel. That is, the value of brightness is changed region by region.

The size of the predetermined region about the designated pixel may be set so that the degree of enhancement of the color border region can be visually recognized, and may be equal to, smaller than or larger than the size of the range of the neighbor pixels. That is, as described above, the size of the range of the neighbor pixels may be set from the viewpoint of accuracy in determining color border regions and the size of the predetermined region about the designated pixel may be set from the viewpoint of easiness in visually recognizing the degree of enhancement of the color border regions. For example, the size of the range of the neighbor pixels may be set to 3×3 with the size of the predetermined region about the designated pixel set to 3×3 or 5×5. As the pixel density increases, the area of the predetermined region on the output image becomes smaller for a given size of the predetermined region. Accordingly, it is preferred that the size of the predetermined region be increased as the pixel density increases in order to facilitate visual recognition of the degree of enhancement of the color border regions.

In a second aspect of the method of the present invention, an image processing method comprises the steps of dividing the color image signal into a plurality of blocks of a predetermined size, and determining the values of brightness and chromaticity of each block on the basis of the values of brightness and chromaticity of each pixel in the block represented by image signal components for the pixel of the color image signal, the step of determining whether a designated block is a block in a color border region of a type where two color regions which are small in brightness difference and large in chromaticity difference are positioned side by side on the basis of the difference in value of brightness between the designated block and neighbor blocks near the designated block and the difference in value of chromaticity between the designated block and the neighbor blocks, the steps of, when the designated block is determined to be a block in a color border region of said type, obtaining the values of brightness and chromaticity of at least two colors representative of colors forming the color border on the basis of the values of brightness and chromaticity of the neighbor blocks, and changing the value of brightness of each pixel in the designated block to a new value different from that represented by the image signal component for the pixel of the color image signal on the basis of the values of brightness and chromaticity of the pixel, the values of brightness and chromaticity of the respective representative colors and a preset order of priority of colors, and the step of making a monochromatic image by setting values of brightness of pixels in the block in the color border region to said new values and setting values of brightness of pixels in the blocks in regions other than the color border region to those as represented by the image signal components for the pixels of the color image signal.

In accordance with a second aspect of the present invention, there is provided an apparatus for making a monochromatic image signal made up of image signal components representing image data on respective pixels from a color image signal made up of image signal components representing image data on respective pixels, the apparatus characterized by having a color border enhancement processing means which changes values of brightness of pixels in a color border region of a type where two color regions which are small in brightness difference and large in chromaticity difference are positioned side by side to new values different from those represented by the image signal components for the pixels of the color image signal and a monochromatic image signal generating means which makes a monochromatic image signal by setting values of brightness of pixels in the color border region to said new values and setting values of brightness of pixels in regions other than the color border region to those as represented by the image signal components for the pixels of the color image signal.

In a first aspect of the apparatus of the present invention, which is for carrying out the first aspect of the method of the present invention, an image processing apparatus comprises a color border determining means which determines whether a designated pixel is a pixel in a color border region of a type where two color regions which are small in brightness difference and large in chromaticity difference are positioned side by side on the basis of the difference in value of brightness between the designated pixel and neighbor pixels near the designated pixel and the difference in value of chromaticity between the designated pixel and the neighbor pixels, a representative color determining means which obtains the values of brightness and chromaticity of at least two colors representative of colors forming the color border concerning the designated pixel determined to be a pixel in the color border region on the basis of the values of brightness and chromaticity of the neighbor pixels, a color border enhancing brightness calculating means which changes the value of brightness of the designated pixel determined to be a pixel in the color border region to a new value different from that represented by the image signal component for the pixel of the color image signal on the basis of the values of brightness and chromaticity of the designated pixel as represented by the image signal component for the pixel of the color image signal, the values of brightness and chromaticity of the respective representative colors and a preset order of priority of colors, and a monochromatic image signal generating means which generates a monochromatic image signal by setting values of brightness of pixels in the color border region to said new values and setting values of brightness of pixels in regions other than the color border region to those as represented by the image signal components for the pixels of the color image signal.

In the apparatus of the first aspect, the color border enhancing brightness calculating means may be arranged to change the value of brightness of each pixel in a predetermined region about the designated pixel to a new value different from that represented by the image signal component for the pixel of the color image signal on the basis of the values of brightness and chromaticity of the pixel, the values of brightness and chromaticity of the respective representative colors and a preset order of priority of colors when the designated pixel is determined to be a pixel in the color border region of said type, with the monochromatic image signal determining means arranged to generate a monochromatic image signal by setting values of brightness of pixels in the predetermined region to said new values.

For example, the color border determining means may be arranged to determine that the designated pixel is a pixel in a color border region of said type when there is at least one pixel in the neighbor pixels whose difference in brightness from that of the designated pixel is smaller than a first threshold value and whose difference in chromaticity from that of the designated pixel is larger than a second threshold value.

For example, the representative color determining means may calculate the differences in chromaticity between a pixel in the neighbor pixels whose difference in brightness from that of the designated pixel is smaller than a first threshold value and whose difference in chromaticity from that of the designated pixel is larger than a second threshold value and the other pixels in the neighbor pixels, and take as the values of chromaticity of the representative colors the values of chromaticity of a pair of pixels which give a maximum difference in chromaticity.

Further, the color border enhancing brightness calculating means may be arranged to determine which of the representative colors the color of the designated pixel belongs to on the basis of the values of brightness and chromaticity of the designated pixel and the values of brightness and chromaticity of each of the representative colors, to change the value of brightness of the designated pixel to a new value by adding a predetermined constant to that represented by the image signal component for the pixel of the color image signal when the representative color to which the color of the designated pixel belongs is higher in the order of priority of colors than the other representative color, and to change the value of brightness of the designated pixel to a new value by subtracting a predetermined constant from that represented by the image signal component for the pixel of the color image signal when the representative color to which the color of the designated pixel belongs is lower in the order of priority of colors than the other representative color.

Further, the color border enhancing brightness calculating means may be arranged to determine which of the representative colors the color of each pixel in a predetermined region belongs to on the basis of the values of brightness and chromaticity of the pixel and the values of brightness and chromaticity of each of the representative colors, to change the value of brightness of the pixel to a new value by adding a predetermined constant to that represented by the image signal component for the pixel of the color image signal when the representative color to which the color of the pixel belongs is higher in the order of priority of colors than the other representative color, and to change the value of brightness of the designated pixel to a new value by subtracting a predetermined constant from that represented by the image signal component for the pixel of the color image signal when the representative color to which the color of the pixel belongs is lower in the order of priority of colors than the other representative color.

In a second aspect of the apparatus of the present invention, which is for carrying out the second aspect of the method of the present invention, an image processing apparatus comprises a block brightness/chromaticity calculating means which divides the color image signal into a plurality of blocks of a predetermined size and determines the values of brightness and chromaticity of each block on the basis of the values of brightness and chromaticity of each pixel in the block represented by image signal components for the pixel of the color image signal, a color border determining means which determines whether a designated block is a block in a color border region of a type where two color regions which are small in brightness difference and large in chromaticity difference are positioned side by side on the basis of the difference in value of brightness between the designated block and neighbor blocks near the designated block and the difference in value of chromaticity between the designated block and the neighbor blocks, a representative color determining means which obtains the values of brightness and chromaticity of at least two colors representative of colors forming the color border concerning the designated block determined to be a block in the color border region on the basis of the values of brightness and chromaticity of the neighbor blocks, a color border enhancing brightness calculating means which changes the value of brightness of each of the pixels in the block determined to be a block in the color border region to a new value different from that represented by the image signal component for the pixel of the color image signal on the basis of the values of brightness and chromaticity of the pixel as represented by the image signal component for the pixel of the color image signal, the values of brightness and chromaticity of the respective representative colors and a preset order of priority of colors, and a monochromatic image signal generating means which generates a monochromatic image signal by setting values of brightness of pixels in the color border region to said new values and setting values of brightness of pixels in regions other than the color border region to those as represented by the image signal components for the pixels of the color image signal.

For example, the color border determining means may be arranged to determine that the designated block is a block in a color border region of said type when there is at least one block in the neighbor blocks whose difference in brightness from that of the designated block is smaller than a first threshold value and whose difference in chromaticity from that of the designated block is larger than a second threshold value.

For example, the representative color determining means may calculate the differences in chromaticity between a block in the neighbor blocks whose difference in brightness from that of the designated block is smaller than a first threshold value and whose difference in chromaticity from that of the designated pixel is larger than a second threshold value and the other blocks in the neighbor blocks, and take as the values of chromaticity of the representative colors the values of chromaticity of a pair of blocks which give a maximum difference in chromaticity.

Further, the color border enhancing brightness calculating means may be arranged to determine which of the representative colors the color of each pixel in the block determined to be a block in a color border region belongs to on the basis of the values of brightness and chromaticity of the pixel and the values of brightness and chromaticity of each of the representative colors, to change the value of brightness of the pixel to a new value by adding a predetermined constant to that represented by the image signal component for the pixel of the color image signal when the representative color to which the color of the pixel belongs is higher in the order of priority of colors than the other representative color, and to change the value of brightness of the pixel to an value by subtracting a predetermined constant from that represented by the image signal component for the pixel of the color image signal when the representative color to which the color of the pixel belongs is lower in the order of priority of colors than the other representative color.

In the present invention, the order of priority of colors may be in the order of white (W), yellow (Y), cyan (C), magenta (M), red (R), green (G), blue (B), black (K) or may be in the order of the values of brightness of the representative colors.

In accordance with the present invention, since pixels in a color border region of a type where two color regions which are small in brightness difference and large in chromaticity difference are positioned side by side are given values of brightness different from those represented by the color image signal and pixels in regions other than such a color border region are given the same values of brightness as represented by the color image signal, the color border region can be enhanced so as to be able to be recognized as change in tone in the monochromatic image while tone information on the region other than the color border region on the color image can be held even in the monochromatic image.

Accordingly, a color image can be converted into a monochromatic image without loss of information on brightness and hue irrespective of brightness and hue on the color image, and at the same time, the problem that the regions which are different from each other in both hue and brightness on the color image are expressed in the same tone on the monochromatic image can be avoided.

When the image input apparatus such as an image scanner or the image output apparatus such as stencil making apparatus is relatively low in resolution, the method in accordance with the first aspect and the apparatus for carrying out the method in accordance with the first aspect in which the values of brightness are changed only for pixels which are determined to be a pixel in the color border region and accordingly the color border is enhanced by pixel are suitable.

To the contrast, when the image input apparatus or the image output apparatus is relatively high in resolution, the effect of enhancement of the color border region is difficult to recognize when the color border region is enhanced by pixel. In such a case, the method in accordance with the second aspect and the apparatus for carrying out the method in accordance with the second aspect in which the values of brightness are changed for pixels which are determined to be a pixel in the color border region and for the neighbor pixels and accordingly the color border is enhanced by block are suitable.

When the color image signal represents an image such as of a color halftone original formed by superposing three colors, C, M and Y, where color frequently changes depending on the place, a color border other than that visually recognized by humans can be detected if the color border region is determined pixel by pixel, which can result in undesirable brightness enhancement. In such a case, by determining the color border region block by block as in the method of the second aspect of the present invention, the color border region can be determined and brightness can be enhanced so as to conform to human view.

The method in accordance with the second aspect and the apparatus for carrying out the method in accordance with the second aspect in which the values of brightness are changed for all the pixels in the block may be applied irrespective of whether the image input apparatus and/or the image output apparatus are low or high in resolution.

By obtaining the values of brightness and chromaticity of the colors representative of colors forming the color border on the basis of the values of brightness and chromaticity of the neighbor pixels/blocks, and obtaining the value of color border enhancing brightness of each pixel on the basis of the values of brightness and chromaticity of the pixel/block, the values of brightness and chromaticity of the respective representative colors and a preset order of priority of colors, the level of enhancement can be set on the basis of general conditions around the color border region and an excessive enhancement can be avoided.

The pixel/block in the color border region and/or the representative colors may be determined in various ways and the brightness enhancement in the color border region may be effected in various ways.

BRIEF DESCRIPTION OF THE DRAWINGS

FIG. 1 is a block diagram showing an image processing apparatus for carrying out an image processing method in accordance with a first or second aspect of the present invention, FIG. 2A is a view for illustrating a designated pixel and reference pixels in the method of the first embodiment of the present invention, FIG. 2B a view for illustrating color border enhancement processing in the method of the first embodiment of the present invention, FIG. 3 is a view showing an example of a monochromatic view obtained by enhancing a color border region of a color image by the method of the first embodiment, FIG. 4 is a view showing an a* -b* plane for determining the representative colors, FIG. 5A is a view for illustrating a designated pixel and reference pixels in the method of the second embodiment of the present invention, FIG. 5B is a view for illustrating color border enhancement processing in the method of the second embodiment of the present invention, FIG. 6 is a block diagram showing an image processing apparatus for carrying out an image processing method in accordance with a third embodiment of the present invention, FIG. 7 is a view for illustrating division into blocks, a designated block and reference blocks in the method of the third embodiment of the present invention, FIG. 8A is a view for illustrating a conventional method of image processing, and FIG. 8B is a view for illustrating the drawbacks of the conventional method.

DESCRIPTION OF THE PREFERRED EMBODIMENTS

FIG. 1 shows an image processing apparatus for carrying out an image processing method in accordance with a first or second embodiment of the present invention. The image processing apparatus comprises an image input means 10, a brightness/chromaticity calculating means 20, a brightness/chromaticity memory means 30, a color border enhancement processing system 40 formed of a color border determining means 41, an representative color determining means 42, a color border enhancing brightness calculating means 43 and a switch 44, a color border enhancing brightness memory means 50, a binary-coding means 60, and an image output means 70.

The color input means 10 reads a color original and samples RGB values of each pixel (8 bits for each color, 24 bits in total). The color input means 10 may comprise, for instance, an image scanner.

The brightness/chromaticity calculating means 20 converts RGB values of each pixel into L*a*b* values of CIE color system (L*:brightness, a*, b*:chromaticity). Conversion of RGB values into L*a*b* values of CIE color system is described, for instance, in "Color Engineering" by Noboru Ohta. The brightness/chromaticity memory means 30 stores L*a*b* values of each pixel calculated by the brightness/chromaticity calculating means 20.

The color border determining means 41 determines whether a designated pixel $P_o$ is a "color border pixel", that is, whether the designated pixel $P_o$ is on a border between two different color regions, on the basis of L*a*b* values of the designated pixel $P_o$ ($L^*_{Po}, a^*_{Po}, b^*_{Po}$) and those of reference pixels Pi (i stands for a pixel number) near the designated pixel $P_o$ ($L^*_{Pi}, a^*_{Pi}, b^*_{Pi}$) The reference pixels will be sometimes called "neighbor pixels". When the image processing apparatus carries out an image processing method in accordance with a first embodiment of the present invention, the color border determining means 41 sets 8 neighbor pixels $P_i$ (i=1 to 8) about each designated pixel $P_o$ (3×3 pixels with the designated pixel $P_o$ included) as shown in FIG. 2A, and determines whether the designated pixel $P_o$ is a "color border pixel" in the following manner. Change in brightness along a transverse line X—X' is as shown in the lower part of FIG. 2A.

a) brightness differences $\Delta L_{PoPi}$ (=$\Delta L_{xy}$) and chromaticity differences $\Delta C_{PoPi}$ (=$\Delta C_{xy}$) on a a*-b* plane between the designated pixel $P_o$ and the reference pixels $P_i$ are calculated according to the following formulae (1) and (2).

$$\Delta L_{xy} L^*_x - L^*_y \quad (1)$$

$$\Delta C_{xy} = \{(a^*_x - a^*_y)^2 + (b^*_x - b^*_y)^2\}^{1/2} \quad (2)$$

b) When the brightness difference $\Delta L_{PoPi}$ between the designated pixel $P_o$ and one of the reference pixels $P_i$ and the chromaticity difference $\Delta C_{PoPi}$ between the designated pixel $P_o$ and the reference pixel $P_i$ simultaneously satisfy the following conditions (1) and (2), the reference pixel $P_i$ is determined to be a prospective pixel of an opposed color which is in prospect of being a pixel opposed to the designated pixel $P_o$ on opposite sides of a color border (such a pixel will be referred to as "a prospective opposed color pixel", hereinbelow).

$$\Delta L_{PoPi} \leq Th_1 \quad \text{(condition 1)}$$

$$\Delta C_{PoPi} \geq Th_2 \quad \text{(condition 2)}$$

c) Steps a) and b) are executed for all the reference pixels $P_1$ to $P_8$ and when at least one of the reference pixels is determined to be a prospective opposed color pixel, the designated pixel $P_o$ is determined to be a color border pixel.

The representative color determining means 42 determines, according to a predetermined condition, the values of brightness and chromaticity of at least two colors representative of colors forming the color border for the designated pixel $P_o$ determined to be a color border pixel.

The color border enhancing brightness calculating means 43 calculates a color border enhancing brightness $L^*_{Po(new)}$ for the color border pixel $P_o$ according to the L*a*b* values of the color border pixel $P_o$ stored in the brightness/chromaticity memory means 30, the L*a*b* values of the representative colors, and a preset order of priority of colors.

The color border enhancing brightness memory means 50 stores the value of the brightness $L^*_{Po}$ which has been stored in the brightness/chromaticity memory means 30 as it is for the designated pixels $L_{Po}$ which are not determined to be a color border pixel by the color border determining means 41 and stores the value of the color border enhancing brightness $L^*_{Po(new)}$ for the designated pixels $L_{Po}$ which are determined to be a color border pixel by the color border determining means 41, thereby obtaining a monochromatic image signal.

The switch 44 of the color border enhancement processing system 40 selectively connects the brightness/chromaticity memory means 30 to the color border enhancing brightness memory means 50 or the representative color determining means 42 so that the L*a*b* values stored in the brightness/chromaticity memory means 30 are input into the representative color determining means 42 (and then into the color border enhancing brightness calculating means 43) only when the designated pixel $P_o$ is determined to be a color border pixel, and the value of the colorborder enhancing brightness $L^*_{Po(new)}$ for the designated pixels $L_{Po}$ is input into the color border enhancing brightness memory means 50, and so that the value of the brightness $L^*_{Po}$ which has been stored in the brightness/chromaticity memory means 30 as it is input into the colorborder enhancing brightness memory means 50 when the designated pixel $L_{Po}$ is not determined to be a color border pixel by the color border determining means 41.

The binary-coding means 60 converts the monochromatic image signal stored in the color border enhancing brightness memory means 50 into a two-valued (binary-coded) image signal.

The image output means 70 outputs a monochromatic image on the basis of the binary-coded monochromatic image signal output from the binary-coding means 60.

An image processing method in accordance with a first embodiment of the present invention as carried out by the image processing means 1 will be described, hereinbelow.

The color input means 10 reads a color original and samples RGB values of each pixel. The brightness/chromaticity calculating means 20 converts RGB values of each pixel into L*a*b* values of CIE color system and the brightness/chromaticity memory means 30 stores L*a*b* values of each pixel calculated by the brightness/chromaticity calculating means 20.

The color border determining means 41 determines whether a designated pixel $P_o$ is a color border pixel on the basis of L*a*b* values of the designated pixel $P_o$ ($L^*_{Po}$, $a^*_{Po}$, $b^*_{Po}$) and those of reference pixels Pi in the manner described above. When the pixel designated pixel $P_o$ is determined to be a color border pixel, the representative color determining means 42 determines, according to a predetermined condition, the values of brightness and chromaticity of at least two colors representative of colors forming the color border for the designated pixel $P_o$ determined to be a color border pixel. Then the color border enhancing brightness calculating means 43 calculates a color border enhancing brightness $L^*_{Po(new)}$ for the color border pixel $P_o$ according to the L*a*b* values of the color border pixel $P_o$ stored in the brightness/chromaticity memory means 30, the L*a*b* values of the representative colors, and a preset order of priority of colors.

Operation of the color border enhancement processing system 40 will be described in more detail assuming that fifth and eighth reference pixels $P_5$ and $P_8$ are determined to be a prospective opposed color pixel for the designated pixel $P_o$ in FIG. 2A. FIG. 4 shows the a*-b* plane for determining the representative colors.

a) The chromaticity difference $\Delta C_{P5Pi}$ (i=1 to 4, 6 to 8) between the fifth reference pixel $P_5$ and each of the other reference pixels $P_i$ (i=1 to 4, 6 to 8) is calculated according to a formula similar to Formula (2) and the chromaticity difference $\Delta C_{P8Pi}$ (i=1 to 7) between the eighth reference pixel $P_8$ and each of the other reference pixels $P_i$ (i=1 to 7) is calculated according to a formula similar to Formula (2).

b) A maximum value Max{$\Delta C_{P5Pi}$, $\Delta C_{P8Pi}$} in the chromaticity differences $\Delta C_{P5Pi}$ and $\Delta C_{P8Pi}$ are obtained.

c) For example, when a pair of reference pixels which give a maximum chromaticity difference are the first reference pixel $P_1$ and the eighth pixel $P_8$, that is, Max{$\Delta C_{P5Pi}$, $\Delta C_{P8Pi}$}=$\Delta C_{P8P1}$, the L*a*b* values of the first and eighth reference pixels $P_1$ and $P_8$ stored in the brightness/chromaticity memory means 30, ($L^*_{P1}$, $a^*_{P1}$, $b^*_{P1}$) and ($L^*_{P8}$, $a^*_{P8}$, $b^*_{P8}$), are respectively taken as the L*a*b* values of the representative colors.

d) The L*a*b* values of the respective representative colors, ($L^*_{P1}$, $a^*_{P1}$, $b^*_{P1}$) and ($L^*_{P8}$, $a^*_{P8}$, $b^*_{P8}$), are projected onto an a*-b* plane such as shown in FIG. 4, and it is determined which of reference colors black (K), white (W), cyan (C), magenta (M), yellow (Y), red (R), green (G), blue (B), each of the representative colors belongs to. As for black and white, when the value $L^*_{P8}$ or $L^*_{P1}$ of brightness satisfies the following condition 3, the representative color is determined to be black while when the value $L^*_{P8}$ or $L^*_{P1}$ of brightness satisfies the following condition 4, the representative color is determined to be white.

$$L^* \leq Th_3 \quad \text{(condition 3)}$$

$$L^* > Th_3 \quad \text{(condition 4)}$$

wherein Th3 is a third threshold value.

e) Also as for designated pixel, it is determined which of reference colors black (K), white (W), cyan (C), magenta (M), yellow (Y), red (R), green (G), blue (B), the color of the designated pixel $P_o$ belongs to on the basis of the L*a*b* values of the designated pixel, ($L^*_{Po}$, $a^*_{Po}$, $b^*_{Po}$), stored in the brightness/chromaticity memory means 30.

f) Then it is determined which of the representative colors, the color of the designated pixel $P_o$ belongs to in terms of the reference color. For example, when one of the representative colors is red (R) and the other is yellow (Y) in terms of the reference color while the color of the designated pixel $P_o$ is red (R) in terms of the reference color, then the color of the designated pixel $P_o$ is determined to belong said one of the representative colors and when the color of the designated pixel $P_o$ is yellow (Y) in terms of the reference color, then the color of the designated pixel $P_o$ is determined to belong said the other of the representative colors.

When the color of the designated pixel $P_o$ belongs to neither of the representative colors in terms of the reference color, it is determined that the color of the designated pixel $P_o$ belongs to one of the representative colors which is smaller in the chromaticity difference from the color of the designated pixel $P_o$($\Delta C_{PoP1}$, $\Delta C_{PoP8}$) than the other.

g) Then a color border enhancing brightness $L^*_{Po(new)}$ for the designated pixel $P_o$ is calculated according to the following formula (3) on the basis of the L*a*b* values of the designated pixel $P_o$ stored in the brightness/chromaticity memory means 30 and a preset order of priority of colors shown in the following table 1 and stored in a memory (not shown), and the calculated color border enhancing brightness $L^*_{Po(new)}$ for the designated pixel $P_o$ is stored in the color border enhancing memory means 50.

TABLE 1

| order | 1 | 2 | 3 | 4 | 5 | 6 | 7 | 8 |
|---|---|---|---|---|---|---|---|---|
| color | W | Y | C | M | R | G | B | K |

(formula 3)

When the representative color which the designated pixel belongs to is lower in priority than the other representative color.

$$L^*_{Po(new)} = L^*_{Po} - \alpha \quad (\alpha \text{ is a constant})$$

When the representative color which the designated pixel belongs to is higher in priority than the other representative color.

$$L^*_{Po(new)} = L^*_{Po} + \alpha \quad (\alpha \text{ is a constant})$$

For example, when the representative colors are R and Y and the color of the designated pixel is R, $L^*_{Po(new)} = L^*_{Po} - \alpha$ since R is lower in priority than Y. Conversely, when the representative colors are R and Y and the color of the designated pixel is Y, $L^*_{Po(new)} = L^*_{Po} + \alpha$ since Y is higher in priority than R.

As for the pixels $P_o$ which are not determined to be a color border pixel by the color border determining means 41, the values of brightness $L^*_{P_o}$ stored in the brightness/chromaticity memory means 30 are stored as they are in the color border enhancing brightness memory means 50.

That is, for the pixels in the color border region, the values of brightness $L^*_{P_o(new)}$ calculated by the color border enhancing brightness calculating means 43 are stored in the color border enhancing brightness memory means 50 whereas, for the pixels in the regions other than the color border region, the values of brightness $L^*_{P_o}$ as represented by the color image signal are stored in the color border enhancing brightness memory means 50.

That is, the color border enhancement processing system 40 determines whether a designated pixel is a color border pixel in a color border region of a type where two color regions which are small in difference of brightness L* and large in difference of chromaticity (a*, b*) are positioned side by side. When it is determined that the designated pixel is a color border pixel, the color enhancement processing system 40 changes the value of brightness L* while when it is not determined that the designated pixel is a color border pixel, the color enhancement processing system 40 uses the value of brightness L* of the pixel as represented by the color image signal. The color enhancement processing system 40 repeats these steps while shifting the designated pixel one by one and changes the value of brightness L* of the color border pixel so that the pixels on one side of the color border becomes higher in value of brightness L* than the pixels on the other side of the color border. In this manner, the color enhancement processing system 40 generates a monochromatic image signal of one frame.

FIG. 2B shows a monochromatic image obtained by carrying out the color border enhancement processing on the pixels of the color image shown in FIG. 2A up to the designated pixel $P_o$ with change in brightness along a transverse line X–X' shown in the lower part of FIG. 2B.

FIG. 3 shows a monochromatic image obtained by carrying out the color border enhancement processing on all the pixels of the color image shown in FIG. 2A with change in brightness along a transverse line X–X' shown in the lower part of FIG. 3.

Though, in the embodiment described above, the color border is enhanced by adding or subtracting a constant α to or from the value of brightness of the color border pixel according to formula (3), the value of the constant α may be changed pixel by pixel, for instance, according to the value of chromaticity (a*, b*).

After the processing by the color enhancement processing system 40 is ended, the binary-coding means 60 binary-codes the value of brightness for each pixel ($L^*_{P_o(new)}$ or $L^*_{P_o}$) and the image output means 70 outputs a monochromatic image on the basis of the binary-coded monochromatic image signal output by the binary-coding means 60.

since the monochromatic image signal is obtained by changing the values of brightness of pixels in the color border region from those represented by the color image signal so that the pixels on one side of the color border becomes higher in value of brightness L* than the pixels on the other side of the color border while holding the values of brightness of pixels in regions other than the color border region as represented by the color image signal, the color-border region can be enhanced so as to be able to be recognized as change in tone in the monochromatic image while tone information on the region other than the color border region on the color image can be held even in the monochromatic image.

Accordingly, the problem that the regions which are different from each other in both hue and brightness on the color image are expressed in the same tone on the monochromatic image can be avoided, and information on change in hue on the color image can be expressed as information on brightness on the monochromatic image. Thus a color image can be converted into a monochromatic image without loss of information on brightness and hue irrespective of brightness and hue on the color image.

An image processing method in accordance with a second embodiment of the present invention as carried out by the image processing means 1 will be described, hereinbelow. The method of the second embodiment is basically the same as the method of the first embodiment except the operation of the color border enhancement processing section 40. That is, in the method of the first embodiment of the present invention, the color border enhancement processing is carried out only on the color border pixels. Whereas, in the second embodiment, the color border enhancement processing is carried out on all the pixels in the block about a color border pixel.

Result of the method in accordance with the first embodiment in which color border enhancement processing is carried out only on the color border pixels is clear when the image input means 10 and the image output means 70 are relatively low in resolution. However, when the image input means 10 and the image output means 70 are relatively high in resolution (high in pixel density), the effect of enhancement of the color border region by the method of the first embodiment becomes difficult to recognize since the area of the enhanced region is small. In such a case, it is preferred that the color border enhancement be carried out over a certain area. In the method of the second embodiment, when a designated pixel $P_o$ is determined to be a color border pixel, the color border enhancement processing is carried out on all the pixels in a predetermined region about the designated pixel $P_o$ as shown in FIG. 5A. The predetermined region is formed of the designated pixel $P_o$ and 5×5 neighbor pixels $P_i$ (i=1 to 24) about the designated pixel $P_o$ as shown in FIG. 5A, where the neighbor pixels are denoted by only the suffixes. Change in brightness along a transverse line X–X' is as shown in the lower part of FIG. 5A. Operation of the method of the second embodiment will be described, hereinbelow.

The processing up to the step d) of determining which of reference colors black (K), white (W), cyan (C), magenta (M), yellow (Y), red (R), green (G), blue (B), each of the representative colors belongs to is the same as in the first embodiment.

After the step d), the following steps are executed.

e) The L*a*b* values of the designated pixel $P_o$ and the 24 neighbor pixels $P_i$, ($L^*_{P_o}$, $a^*_{P_o}$, $b^*_{P_o}$) and ($L^*_{P_i}$, $a^*_{P_i}$, $b^*_{P_i}$), are projected onto an a*-b* plane such as shown in FIG. 4, and it is determined which of reference colors black (K), white (W), cyan (C), magenta (M), yellow (Y), red (R), green (G), blue (B), the color of each of the pixels belongs to. As for black and white, when the value $L^*_{P_o}$ or $L^*_{P_i}$ of brightness satisfies the aforesaid condition 3, the color of the pixel is determined to be black while when the value $L^*_{P_o}$ or $L^*_{P_i}$ of brightness satisfies the aforesaid condition 4, the color of the pixel is determined to be white.

f) Then it is determined which of the representative colors, the color of the designated pixel $P_o$ and the colors of the 24 neighbor pixels $P_i$ belong to in terms of the reference color in the manner similar to that in the first embodiment.

g) Then a color border enhancing brightness $L^*_{P_o(new)}$ for the designated pixel $P_o$ is calculated according to the aforesaid formula (3) on the basis of the L*a*b* values of the designated pixel $P_o$ stored in the brightness/chromaticity memory means 30 and a preset order of priority of colors shown in the aforesaid table 1, and the calculated color border enhancing brightness $L^*_{P_o(new)}$ for the designated pixel $P_o$ is stored in the color border enhancing memory means 50. In the similar manner, a colorborder enhancing brightness $L^*_{P_i(new)}$ for each of the neighbor pixels $P_i$ is calculated according to the aforesaid formula (3) on the basis of the L*a*b* values of the pixel $P_i$ stored in the brightness/chromaticity memory means 30 and a preset order of priority of colors shown in the aforesaid table 1, and the calculated color border enhancing brightness $L^*_{P_i(new)}$ for the pixel $P_i$ is stored in the color border enhancing memory means 50. The pixels which have been subjected to the color border enhancement processing in conjunction with a preceding designated pixel $P_o$ are not subjected to the color border enhancement processing at this time.

As for the pixels $P_o$ which are not determined to be a color border pixel by the color border determining means 41, the values of brightness $L^*_{P_o}$ stored in the brightness/chromaticity memory means 30 are stored as they are in the color border enhancing brightness memory means 50.

That is, for the pixels in the color border region, the values of brightness $L^*_{P_o(new)}$ calculated by the color border enhancing brightness calculating means 43 are stored in the color border enhancing brightness memory means 50 whereas, for the pixels in the regions other than the color border region, the values of brightness $L^*_{P_o}$ as represented by the color image signal are stored in the colorborder enhancing brightness memory means 50.

That is, the color border enhancement processing system 40 determines whether a designated pixel is a color border pixel in a color border region of a type where two color regions which are small in difference of brightness L* and large in difference of chromaticity (a*, b*) are positioned side by side. When it is determined that the designated pixel is a color border pixel, the color enhancement processing system 40 changes the values of brightness L* of the designated pixel $P_o$ and the 24 neighbor pixels $P_i$ while when it is not determined that the designated pixel is a color border pixel, the color enhancement processing system 40 uses the value of brightness L* of the pixel as represented by the color image signal. The color enhancement processing system 40 repeats these steps while shifting the designated pixel one by one and changes the values of brightness L* of the color border pixel and its neighbor pixels. In this manner, the color enhancement processing system 40 generates a monochromatic image signal of one frame.

FIG. 5B is a monochromatic image obtained by carrying out the color border enhancement processing in accordance with the second embodiment on all the pixels of the color image shown in FIG. 5A with change in brightness along a transverse line X–X' shown in the lower part of FIG. 5B.

After the processing by the color enhancement processing system 40 is ended, the binary-coding means 60 binary-codes the value of brightness for each pixel ($L^*_{P_o(new)}$ or $L^*_{P_o}$) and the image output means 70 outputs a monochromatic image on the basis of the binary-coded monochromatic image signal output by the binary-coding means 60.

Since the monochromatic image signal is obtained by changing the values of brightness of pixels in the color border region from those represented by the color image signal while holding the values of brightness of pixels in regions other than the color border region as represented by the color image signal, the color border region can be enhanced so as to be recognized as change in tone in the monochromatic image while tone information on the region other than the color border region on the color image can be held even in the monochromatic image.

Further, in accordance with the method of the second embodiment, since the color border is enhanced over a certain width (in the range of 5×5 pixels in the particular embodiment described above), the area of enhanced region is increased and color border enhancement can be easily recognized even when the image input means 10 and the image output means 70 are high in resolution.

Further, though, in the embodiment described above, the pixels which have been subjected to the color border enhancement processing in conjunction with a preceding designated pixel $P_o$ are not subjected to the color border enhancement processing. However, it is possible to carry out the colorborder enhancement processing every time the pixel is set as a designated pixel or the neighbor pixel. For example, the color border enhancing brightness $L^*_{P_i(new)}$ calculated before may be replaced by the newly calculated color border enhancing brightness $L^*_{P_i(new)}$, or one of the color border enhancing brightness $L^*_{P_i(new)}$ calculated before and the newly calculated color border enhancing brightness $L^*_{P_i(new)}$ may be selected under a certain condition, or the average of the values may be taken as a final color border enhancing brightness $L^*_{P_i(new)}$ for the pixel. That is, though the color border enhancing brightness $L^*_{P_i(new)}$ may be calculated in various manners, it is preferred that the color border enhancing brightness $L^*_{P_i(new)}$ be calculated so that an excessive enhancement is not caused.

An image processing method in accordance with a third embodiment of the present invention will be described, hereinbelow. The image processing method of this embodiment is carried out, for instance, by the image processing apparatus shown in FIG. 6. The image processing apparatus shown in FIG. 6 is basically the same as that shown in FIG. 1 except that the image is divided into a plurality of blocks of a predetermined size, whether the block is in a colorborder region is determined and each of the pixels in the block determined to be a color border block is subjected to the color border enhancement processing in the third embodiment whereas whether the pixel is a color border pixel is determined pixel by pixel and the color border enhancement processing is carried out pixel by pixel in the first embodiment. Mainly the difference of the third embodiment from the first embodiment will be described, hereinbelow.

FIG. 6 shows an image processing apparatus for carrying out an image processing method in accordance with a third embodiment of the present invention. As shown in FIG. 6, the color border enhancement processing system 40 in this embodiment comprises a block brightness/chromaticity calculating means 46 and a block brightness/chromaticity memory means 47 in addition to the color border determining means 41, the representative color determining means 42, the color border enhancing brightness calculating means 43 and the switch 44 in the color border enhancement processing system 40 in the first embodiment.

When the color image signal represents an image such as of a color halftone original formed by superposing three colors, C, M and Y, where color frequently changes depending on the place, there is fear that C, M and Y are independently read by the image input means 10 and a color border other than that visually recognized by humans can be detected if the color border region is determined pixel by pixel, which can result in undesirable brightness enhancement. In such a case, by determining the color border region block by block as in the method of the second aspect of the present invention, the color border region can be determined and brightness can be enhanced so as to conform to human view.

In the third embodiment, a monochromatic image is made from a color image in the following manner. The steps from the step of reading the color original by the image input means 10 to the step of storing the L*a*b* values in the brightness/chromaticity memory means 30 are basically the same as those in the first embodiment.

In the third embodiment, the following steps a) and b) are executed after the step of storing the L*a*b* values in the brightness/chromaticity memory means 30 and before the processing by the color border enhancement processing system 40.

a) The color image signal representing the L*a*b* values of each pixel is divided into a plurality of blocks of a predetermined size by the block brightness/chromaticity calculating means 46. It is preferred that the size of each block be larger than the size of the range of the neighbor pixels (3×3) which is used for the color border enhancement. In this particular embodiment, the size of each block is set to be 6×6 as shown in FIG. 7.

b) Then, the average of the L*a*b* values of the pixels in each block and the average is taken as the block L*a*b* values for the block. The block L*a*b* values are stored in the block brightness/chromaticity memory means 47.

Then in the color border enhancement processing system 40, the processing basically the same as that in the first embodiment is carried out. That is, the color border determining means 41 determines whether the designated block $B_o$ is a color border block on the basis of the L*a*b* values of the designated block and those of the reference blocks $B_i$ stored in the block brightness/chromaticity memory means 47. When the designated block $B_o$ is determined to be a color border block, the values of brightness and chromaticity of at least two colors representative of colors forming the color border are determined by the representative color determining means 42 in the same manner as in the first embodiment.

The color border enhancing brightness calculating means 43 calculates a color border enhancing brightness $L^*_{Po(new)}$ for each pixel in the color border block $B_o$ according to the L*a*b* values of the pixel stored in the brightness/chromaticity memory means 30, the L*a*b* values of the representative colors, and a preset order of priority of colors in the following manner.

c) The color border enhancing brightness calculating means 43 designates one of the pixels in the color border block $B_o$ and calculates the averages of the L*a*b* values of the designated pixel $P_o$ and its 8 neighbor pixels $P_i$ stored in the brightness/chromaticity memory means 30. Then the color border enhancing brightness calculating means 43 takes averages as the L*a*b* values of the designated pixel.

d) The L*a*b* values of the designated pixel $P_o$ thus obtained are projected onto an a*-b* plane such as shown in FIG. 4, and it is determined which of reference colors black (K), white (W), cyan (C), magenta (M), yellow (Y), red (R), green (G), blue (B), the color of the designated pixel $P_o$ belongs to. As for black and white, when the value $L^*_{Po}$ of brightness satisfies the aforesaid condition 3, the color of the pixel is determined to be black while when the value $L^*_{Po}$ of brightness satisfies the aforesaid condition 4, the color of the pixel is determined to be white. In this embodiment, since the averages of the L*a*b* values of 9 pixels are taken as the L*a*b* values of the designated pixel $P_o$, color determination is effected on the basis of the L*a*b* values of a certain area. Accordingly, even if the color image signal represents an image such as of a color halftone original where color frequently changes depending on the place, the color border region can be determined more accurately so as to conform to human view as compared with when the color determination is effected pixel by pixel.

e) Then it is determined which of the representative colors, the color of the designated pixel $P_o$ belongs to in terms of the reference color in the manner similar to that in the first embodiment.

f) Then a color border enhancing brightness $L^*_{Po(new)}$ for the designated pixel $P_o$ is calculated according to the aforesaid formula (3) on the basis of the L*a*b* values of the designated pixel $P_o$ stored in the brightness/chromaticity memory means 30 and a preset order of priority of colors shown in the aforesaid table 1, and the calculated color border enhancing brightness $L^*_{Po(new)}$ for the designated pixel $P_o$ is stored in the color border enhancing memory means 50. In the similar manner, a color border enhancing brightness for each of the pixels in the color border block is calculated.

Block $B_5$ in FIG. 7 is designated next, and the same steps are repeated on the block $B_5$ using a reference region of 3×3 size. In this manner, effecting the color border enhancement on the same pixel two or more times can be prevented, whereby fear of excessively enhancing the color border can be avoided.

As can be understood from the description above, in accordance with the third embodiment, even if the input color image signal represents an image such as of a color halftone original formed by superposing three colors, C, M and Y, the color border region can be determined so as to conform to human view. This is also true for a color image obtained from a silver halide picture, where color frequently changes depending on the place. Further, as in the second embodiment, since the color border is enhanced over a certain width (in the range of 6×6 pixels in the particular embodiment described above), the area of enhanced region is increased and color border enhancement can be easily recognized even when the image input means 10 and the image output means 70 are high in resolution.

The present invention need not be limited to the embodiments described above.

For example, in place of L*a*b* values of CIE color system, L*u*v* values of CIE color system may be used. Further, the brightness/chromaticity calculating means 20 maybe eliminated so that the RGB values from the image input means 10 are directly used.

Though, in the embodiment described above, the image input means 10 outputs color information on the original as RGB values, the image input means 10 may output color information on the original as other values.

Further, though, in the embodiment described above, the color border enhancing brightness calculating means 43 increases values of brightness of pixels on one side of the color border while reducing values of brightness of pixels on the other side of the color border, the color border enhancing brightness calculating means 43 may enhance the color border in various ways. For example, it may increase values of brightness of pixels on one side of the color border with values of brightness of pixels on the other side of the color border left as they are.

The image processing method of the present invention may be used for displaying a color image on a monochromatic display, or may be used for transferring a color original from a color facsimile to a black and white facsimile.

The invention claimed is:

1. An image processing method of making a monochromatic image signal made up of image signal components representing image data on respective pixels from a color image signal made up of image signal components representing image data on respective pixels, the method characterized in that values of brightness of pixels in a color border region of a type where two color regions which are small in brightness difference and large in chromaticity difference are positioned side by side are changed to new values different from those represented by the image signal components for the pixels of the color image signal, and a monochromatic image signal is generated with values of brightness of pixels in the color border region set to said new values and values of brightness of pixels in regions other than the color border region set to those as represented by the image signal components for the pixels of the color image signal.

2. An image processing method of making a monochromatic image signal made up of image signal components representing image data on respective pixels from a color image signal made up of image signal components representing image data on respective pixels, the method comprising the step of determining whether a designated pixel is a pixel in a color border region of a type where two color regions which are small in brightness difference and large in chromaticity difference are positioned side by side on the basis of the difference in value of brightness between the designated pixel and neighbor pixels near the designated pixel and the difference in value of chromaticity between the designated pixel and the neighbor pixels, the steps of, when the designated pixel is determined to be a pixel in a color border region of said type, obtaining the values of brightness and chromaticity of at least two colors representative of colors forming the color border on the basis of the values of brightness and chromaticity of the neighbor pixels, and changing the value of brightness of the designated pixel to a new value different from that represented by the image signal component for the pixel of the color image signal on the basis of the values of brightness and chromaticity of the designated pixel as represented by the image signal component for the pixel of the color image signal, the values of brightness and chromaticity of the respective representative colors and a preset order of priority of colors, and the step of making a monochromatic image signal by setting values of brightness of pixels in the color border region to said new values and setting values of brightness of pixels in regions other than the color border region to those as represented by the image signal components for the pixels of the color image signal.

3. An imaging processing method as defined in claim 2 in which, when the designated pixel is determined to be a pixel in a color border region of said type, the value of brightness of each pixel in a predetermined region about the designated pixel is changed to a value different from that represented by the image signal component for the pixel of the color image signal on the basis of the values of brightness and chromaticity of the pixel, the values of brightness and chromaticity of the respective representative colors and a preset order of priority of colors.

4. An image processing apparatus for making a monochromatic image signal made up of image signal components representing image data on respective pixels from a color image signal made up of image signal components representing image data on respective pixels, the apparatus characterized by having a color border enhancement processing means which changes values of brightness of pixels in a color border region of a type where two color regions which are small in brightness difference and large in chromaticity difference are positioned side by side to new values different from those represented by the image signal components for the pixels of the color image signal and a monochromatic image signal generating means which makes a monochromatic image signal by setting values of brightness of pixels in the color border region to said new values and setting values of brightness of pixels in regions other than the color border region to those as represented by the image signal components for the pixels of the color image signal.

5. An image processing apparatus for making a monochromatic image signal made up of image signal components representing image data on respective pixels from a color image signal made up of image signal components representing image data on respective pixels comprising a color border determining means which determines whether a designated pixel is a pixel in a color border region of a type where two color regions which are small in brightness difference and large in chromaticity difference are positioned side by side on the basis of the difference in value of brightness between the designated pixel and neighbor pixels near the designated pixel and the difference in value of chromaticity between the designated pixel and the neighbor pixels, a representative color determining means which obtains the values of brightness and chromaticity of at least two colors representative of colors forming the color border concerning the designated pixel determined to be a pixel in the color border region on the basis of the values of brightness and chromaticity of the neighbor pixels, a color border enhancing brightness calculating means which changes the value of brightness of the designated pixel determined to be a pixel in the color border region to a new value different from that represented by the image signal component for the pixel of the color image signal on the basis of the values of brightness and chromaticity of the designated pixel as represented by the image signal component for the pixel of the color image signal, the values of brightness and chromaticity of the respective representative colors and a preset order of priority of colors, and a monochromatic image signal generating means which generates a monochromatic image signal by setting values of brightness of pixels in the color border region to said new values and setting values of brightness of pixels in regions other than the color border region to those as represented by the image signal components for the pixels of the color image signal.

6. An image processing apparatus as defined in claim 5 in which the color border enhancing brightness calculating means changes the value of brightness of each pixel in a predetermined region about the designated pixel to a new value different from that represented by the image signal component for the pixel of the color image signal on the basis of the values of brightness and chromaticity of the pixel, the values of brightness and chromaticity of the respective representative colors and a preset order of priority of colors when the designated pixel is determined to be a pixel in the color border region of said type, and the monochromatic image signal determining means generates a monochromatic image signal by setting values of brightness of pixels in the predetermined region to said new values.

7. An image processing apparatus as defined in claim 5 in which the color border determining means determines that the designated pixel is a pixel in a color border region of said type when there is at least one pixel in the neighbor pixels whose difference in brightness from that of the designated pixel is smaller than a first threshold value and whose difference in chromaticity from that of the designated pixel is larger than a second threshold value.

8. An image processing apparatus as defined in claim 5 in which the representative color determining means calculates the differences in chromaticity between a pixel in the neighbor pixels whose difference in brightness from that of the designated pixel is smaller than a first threshold value and whose difference in chromaticity from that of the designated pixel is larger than a second threshold value and the other pixels in the neighbor pixels, and takes as the values of chromaticity of the representative colors the values of chromaticity of a pair of pixels which give a maximum difference in chromaticity.

9. An image processing apparatus as defined in claim 5 in which the color border enhancing brightness calculating means determines which of the representative colors the color of the designated pixel belongs to on the basis of the values of brightness and chromaticity of the designated pixel and the values of brightness and chromaticity of each of the representative colors, changes the value of brightness of the designated pixel to a new value by adding a predetermined constant to that represented by the image signal component for the pixel of the color image signal when the representative color to which the color of the designated pixel belongs is higher in the order of priority of colors than the other representative color, and changes the value of brightness of the designated pixel to a new value by subtracting a predetermined constant from that represented by the image signal component for the pixel of the color image signal when the representative color to which the color of the designated pixel belongs is lower in the order of priority of colors than the other representative color.

10. An image processing apparatus as defined in claim 9 in which the color border enhancing brightness calculating means determines which of the representative colors the color of each pixel in a predetermined region belongs to on the basis of the values of brightness and chromaticity of the pixel and the values of brightness and chromaticity of each of the representative colors, changes the value of brightness of the pixel to a new value by adding a predetermined constant to that represented by the image signal component for the pixel of the color image signal when the representative color to which the color of the pixel belongs is higher in the order of priority of colors than the other representative color, and changes the value of brightness of the designated pixel to a new value by subtracting a predetermined constant from that represented by the image signal component for the pixel of the color image signal when the representative color to which the color of the pixel belongs is lower in the order of priority of colors than the other representative color.

11. An image processing apparatus as defined in claim 5 in which the order of priority of colors is in the order of white, yellow, cyan, magenta, red, green, blue, black or in the order of the values of brightness of the representative colors.

* * * * *